Sept. 3, 1935.  H. HOLZWARTH  2,012,963
POWER PLANT AND METHOD OF OPERATING SAME
Filed Jan. 30, 1931  2 Sheets-Sheet 1

Inventor
Hans Holzwarth

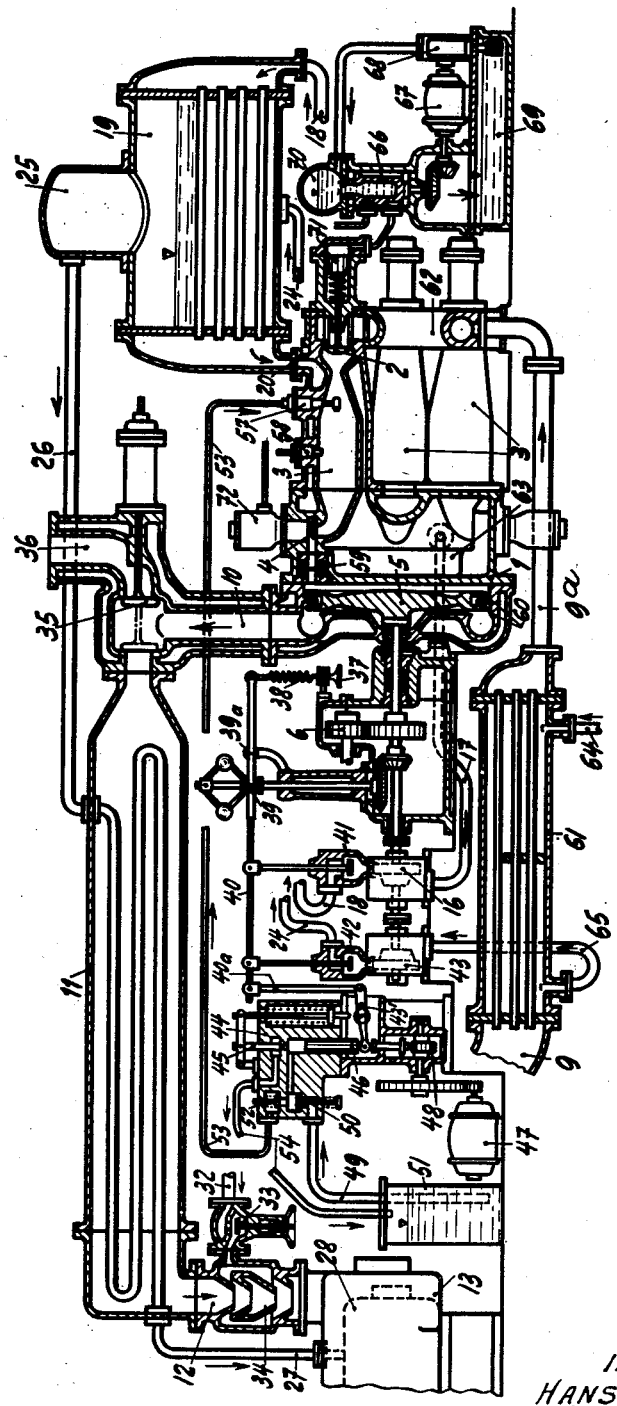

Patented Sept. 3, 1935

2,012,963

UNITED STATES PATENT OFFICE 2,012,963

POWER PLANT AND METHOD OF OPERATING SAME

Hans Holzwarth, Dusseldorf, Germany, assignor to Holzwarth Gas Turbine Co., San Francisco, Calif., a corporation of Delaware Application January 30, 1931, Serial No. 512,342
In Germany February 5, 1930

8 Claims. (Cl. 60—49)

The present invention relates to an improved method of operating power plants which are to start under load, and which are composed of one or more explosion turbines arranged to drive one or more air compressors and of independently mounted expansion machines which are driven separately by gases and by steam and deliver the net or available output of the plant; such plants may be employed, for example, to drive vehicles, traction engines and similar machines.

The present invention is based upon the discovery that the changes in capacity of the available output delivering expansion machine which utilizes a driving medium in the form of explosion turbine exhaust gases under pressure in a continuous stream, are proportional to the changes in the output which the steam generated with the aid of the waste heat of the explosion turbine develops in the steam section of the available output delivering expansion machines. In accordance with the present invention, therefore, it is sufficient to regulate only the explosion turbine (although auxiliary regulation of one or more other units may be utilized), so that its exhaust gases and the steam generated with the aid of the waste heat of said turbine develop the necessary available output or motive power in the expansion machines; this control I effect under constant specific heat content in the charge conducted into the explosion turbine and with constant number of cycles per chamber of the explosion turbine per unit of time, preferably only by regulation of the speed of revolution of the same. This mode of control is of particular advantage for power plants of the type under consideration, because in the methods of control wherein the number of working explosion chambers or the number of cycles in each chamber per unit of time is changed, and only the pressure of the charging air remains constant, the admission pressure in advance of the continuous current turbine must be synchronously controlled; if this regulation is accomplished by control of the nozzles, then the continuous current turbine must be constructed in the form of a Curtis turbine or as a partially impinged action turbine. The speed regulation of the explosion turbine and the resulting regulation of the quantity of combustion gases thus simplifies the operation of the plant by elimination of the separate regulation of the continuous current turbine which is necessary in other modes of control, and thus eliminates any interdependence between the method of control employed and the construction of the continuous current turbine. The control with constant specific heat content of the charge has the special advantage that the gas velocities remain constant because the maximum combustion temperature remains the same in view of such constant specific heat content of the charge. Constant gas current velocities produce constant turbine efficiency, so that the latter remains constant independently of any condition of regulation of the turbine. By constant specific heat content of the charge is meant the saturation of a normal cubic meter of air with fuel; a normal cubic meter of air being one measured at 0° C. and 760 mm. of mercury.

In further recognition of the fact that upon change in the speed or number of revolutions per minute of an explosion turbine directly coupled with a compressor which generates the charging air for such turbine, the output of the compressor does not change proportionally with the output of the explosion turbine, so that the suitably dimensioned compressor delivers a quantity of air which at times is greater than that necessary to support the explosions in the explosion turbine, I propose in a further development of the invention to make the excess air available for the purpose of driving the vehicle. If such excess air is added to the gases exhausting from the explosion turbine, not only is the pneumatic energy contained therein utilized in the most economical manner, but the temperature of such exhaust gases is lowered before they enter the continuous current turbine without causing any loss in output. The air delivered by the compressor can, however, also be employed when the engine is idling as, for example, when the vehicle is traveling down-hill, by introducing the same into the expansion machines to prevent their heating up. These expansion machines include both the gas section and the steam section, and the excess air is introduced only into such expansion machines.

It has already been mentioned that by the control of the explosion turbine the output changes in the gas and steam sections of the expansion machines occur synchronously and proportionally. The cooling oil which absorbs the waste or excess heat of the combustion gas turbine and transfers such heat to feed water, preferably preheated, in order to generate working steam, accordingly suffers variations in its incoming and outflowing temperatures into or out of the turbine and into or out of the heat exchanger corresponding to the variations in output, if care is not taken, through control of the oil pump in dependence upon the explosion turbine, that the velocity of the oil stream changes to keep the said temperatures constant. The present invention therefore contemplates also the regulation of the feed water pump in dependence upon the regulation of the explosion turbine, in order that a sufficient and not too large a feed of feed water to the oil heated boiler results, corresponding to the weight of steam necessary for the operation of the steam section of the expansion machines.

The accompanying drawings illustrate by way of example an embodiment of the invention in the form of a power plant for locomotives.

In said drawings,

Fig. 3 shows a section through the explosion turbine, the cooling oil circuit, and the main control elements of the plant on an enlarged scale, the air compressor being omitted for the sake of clearness.

Figure 1:
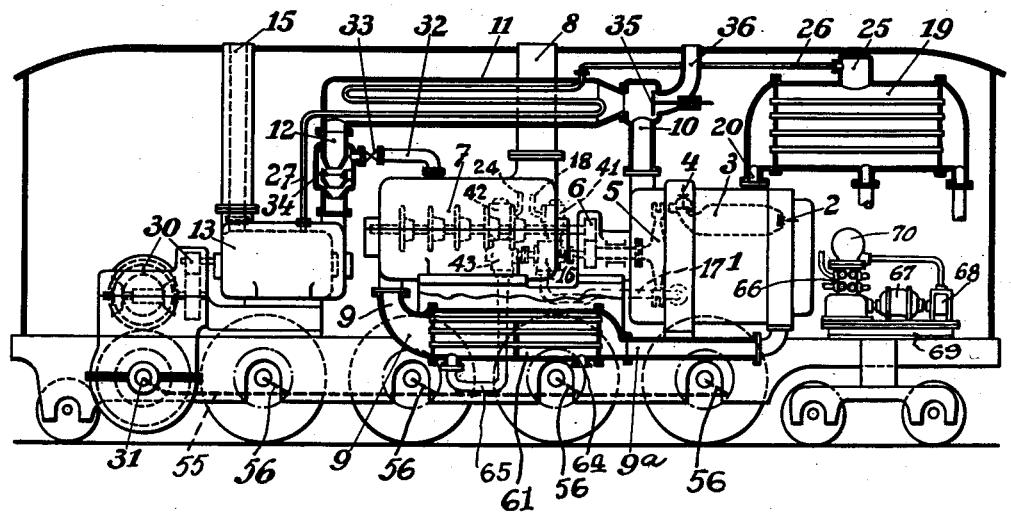
Fig. 1 is a schematic view illustrating a longitudinal section through a locomotive having my invention embodied therein.

The numeral 1 indicates an explosion turbine of the general construction shown in my United States Patent No. 1,672,529 which includes a plurality of explosion chambers 3, three of which are shown in Fig. 3, and which are fed with air through one or more inlet valves 2 and with fuel through the injection devices 57. The successive explosive mixtures in each of the chambers 3 are exploded at the proper instants by means of a spark plug 58 or other suitable igniting device. Shortly after the ignition, a suitably timed nozzle valve 4 is opened to permit the high temperature, high pressure explosion gases to discharge into an expansion nozzle 59 by which they are directed in puffs and at high velocity against a rotor 5 which may be in the form of a Curtis wheel provided with two rings of blades 60. The wheel 5 is connected through a transmission 6 with a compressor 7 which provides the compressed air which supports the explosions in chambers 3. The compressor is shown only in Fig. 1, it being omitted from Fig. 3 to permit the regulating apparatus to be seen. The air for the compressor is sucked in through a conduit 8 and is conducted through a conduit 9, a heat exchanger 61 and a conduit 9a in compressed condition to a manifold 62 communicating with the air inlet valves 2 of the explosion chambers. The gases exhausting from the turbine 5 are conducted by pipe 10 to a heat exchanger 11; the latter is preferably of such size that after traversing the same the gases leave in the form of a continuous stream and pass through the conduit 12 to the combustion gas turbine 13. After giving up the rest of their available energy in such turbine 13, the gases are discharged into the atmosphere through the exhaust pipe 15.

The valves 2 and 4 are actuated at constant cycle number by means of oil under pressure as indicated in Fig. 3, such oil being controlled by a rotating distributor 66 driven at constant speed by the motor 67. This distributor is of the type disclosed in my United States Patent No. 1,763,154 and in my copending application Ser. No. 370,312 (which has issued as Patent No. 1,810,768). The oil pump 68 is driven by the same motor and sucks the oil from the supply tank 69 and forces it under pressure into the air chamber 70 which is connected with the interior of the distributor 66. During a revolution of the distributor, the oil under pressure is permitted to flow in known manner to the piston 71 of the inlet valve 2 to open the latter and to a similar control device 72 of the nozzle valve 4 (in which, however, the control oil keeps the valve closed) or is discharged from such devices to permit the valves to move under the action of their springs.

Certain of the parts of the explosion turbine which are to be cooled are surrounded with a film of cooling oil circulating in cooling jackets to which is transmitted the excess or waste heat to keep the turbine parts from overheating. Such cooling jackets are shown in my copending application Serial No. 512,340, filed simultaneously herewith and are disclosed also in German Patent No. 522,103 and in British Patent No. 296,154. The heated oil streams from the various parts of the turbine are united in the chamber 63 into a single current which is withdrawn from the turbine jackets by the rotary pump 16 through conduit 17. The pump discharges the oil into a valve 41 and through the tube 18 to a heat exchanger 19 built in the form of a steam boiler. After the cooling oil has given up the heat abstracted from the turbine, it flows through conduit 20 back to the cooling jackets of the turbine in which it again absorbs an amount of heat necessary to keep the turbine parts from exceeding a safe temperature, after which it is again charged into the boiler 19.

Figure 2:
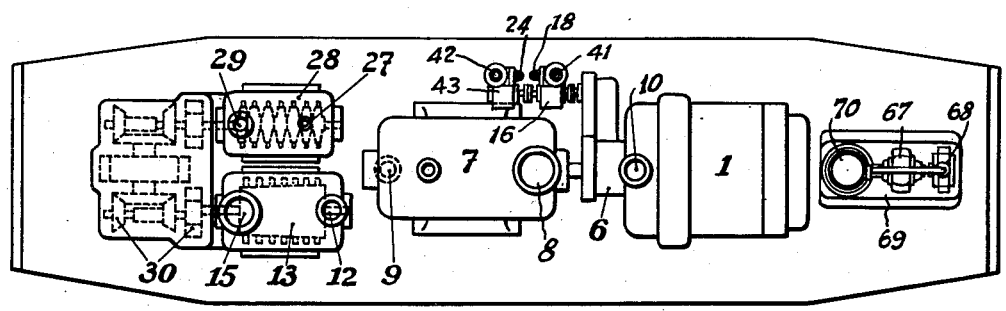
Fig. 2 is a plan view of certain parts of the plant.

The boiler 19 is charged with feed water by a pipe 24, such water being preferably preheated by heat abstracted from the compressed air in the heat exchanger 61. The water is sucked by the pump 43 through the pipe 64 into the heat exchanger 61 and then through pipe 65. After passing the pump 43 it flows to the valve 42 which regulates the flow. The water is vaporized in the boiler 19 and the steam collected in the dome 25 from which it is withdrawn by a pipe 26 and conveyed to the heat exchanger 11 through which, as stated above, flow the gases exhausting from the turbine 5, the steam being thus superheated by the exhaust gases. The superheated steam is conveyed by pipe 27 to a steam turbine 28 and after expansion therein is discharged through pipe 29 into the atmosphere (see Fig. 2). Both the continuous current gas turbine 13 and the steam turbine 28 deliver their power through a common bevel gear transmission 30 to a dummy axle 31 of the locomotive from which the drive wheels of the locomotive, coupled in fours by the connecting rod 55 and the cranks 56, are driven in known manner.

In accordance with the present invention, the power plant described above is regulated primarily by adjusting the speed of the explosion turbine to the value at which the gases exhausting from such turbine and the steam develop the necessary power output in the continuous current gas turbine 13 and in the steam turbine 28. This regulation may, for example, be accomplished by the shifting of a sleeve of the regulator as described hereinbelow. Upon starting the locomotive, which may have a train coupled thereto, the explosion turbine is brought to high speed so that combustion gases and steam can be brought into action in the turbines 13 and 28 under full admission pressure. As explained more fully hereinbelow, the number of revolutions per minute of the explosion turbine 1 is brought down with varying speed to the value at which the combustion gases and steam develop in the turbines 13 and 28 the available power output necessary at any given time.

When the explosion turbine runs at such lower speed, the compressor 7 delivers an excess of air.

In accordance with the present invention, this excess of air, whose creation depends upon the regulation of the plant, is utilized economically in the following manner: The compressor 7 is connected by means of conduit 32 and through a valve 33 to a mixing chamber 34 which is arranged in the conduit 12. The excess air is mixed in the chamber 34 with the gases coming from the explosion turbine and is thus utilized without loss of energy for driving the vehicle with simultaneous cooling of the combustion gases which operate the continuous current turbine 13. Finally, when the engine is idling, as when the vehicle is running down-hill, compressed air can be conducted through conduit 32, valve 33 and chamber 34 to the continuous current turbine 13 to cool the blades of the latter. When the explosion turbine 1 is run at idling speed, the valve 35 is operated (as described in my copending application Serial No. 512,343) to close the gas inlet to the superheater 11 and cause the exhaust gases to discharge into the atmosphere through the exhaust pipe 36.

It will be obvious that the mode of operation above described in connection with a single explosion turbine, can be applied also to plants wherein a plurality of explosion turbines are employed as primary machines, and that while in the preferred form of the invention the regulation is effected only by regulating the speed of the explosion turbine, the advantages of the present invention will be obtained even if such mode of regulation is supplemented by any known auxiliary regulation.

My improved method of regulation is in general of advantage only for the higher speed ranges, for at low speeds, the efficiency of the explosion turbine falls rapidly; for example, in a turbine in which at 3300 R. P. M. the full output of the compressor is used in the explosion chambers, the regulation covers the range between about 2000 and 3300 R. P. M.

Fig. 3 is a schematic illustration of the principal controlling parts of the power plant. The numeral 1 indicates the explosion turbine. The manipulation of handwheel 37 alters the number of revolutions of the explosion turbine, that is to say, if handwheel 37 is operated, the tension of spring 38 is changed, which in its turn causes the regulator sleeve 39 to shift its position.

When, for example, the spring 38 is pulled downwards by turning the hand-wheel 37 the regulator sleeve 39 and with it the part of the lever arm 40 at the left of the fixed pivot 39a as a result move upwardly under the influence of the centrifugal force of the governor. The fuel pump 44 is coupled with the lever arm 40 through the rod 40a in such a manner that the by-pass valve 45 of the pump is opened at an earlier instant during the lift of the plunger 46 due to the upward adjustment of the lever 43'. As the supply of fuel to the conduit 53, and hence to the injector devices 57, ceases at the instant at which the by-pass valve 45 is opened, then with earlier opening of such valve the quantity of fuel fed to the turbine is reduced. As a result the output of the explosion turbine 1 falls and likewise its speed corresponding to the output characteristic of the compressor driven thereby, whereupon the regulator sleeve 39 returns automatically to its former position.

The adjusting gear of the regulator is connected in such manner to elements 41 and 42— which serve to alter the volumes of delivery from cooling oil pump 16 and feed water pump 43— on the one hand and on the other hand is also so connected to element 43' of the fuel pump 44 as described that, when the number of revolutions per minute of the explosion turbine is decreased by operating handwheel 37, the volume of delivered cooling oil, feed water and fuel is also reduced, while, on increasing the number of revolutions per minute of the explosion turbine by operating handwheel 37, these volumes of delivery from the pumps are correspondingly increased. Self-increases of the number of revolutions of the explosion turbine, of course, are compensated in the reverse sense, that is to say, the delivery of fuel and with it of cooling oil and feed water drops in volume, while self-decreases of the number of revolutions of the explosion turbine cause an increase in volume of the delivery of the cooling oil, feed water and fuel. Elements 41 and 42 are constructed as simple throttling devices. Element 43' of fuel pump 44, however, is a simple rocking lever, whose centre of rotation is altered in dependence of the movements of adjusting gear 49, with the result that, in correspondence with the shifting of the centre of rotation of said rocking lever, by-pass valve 45 which determines the effective volume of delivery of the pump opens sooner or later. Plunger 46 of the fuel pump, driven from motor 47 by means of cam 48 sucks fuel through conduit 49 and suction valve 50 from fuel container 51 while the delivered volume of fuel passes through delivery valve 52 and delivery conduit 53 and fuel injection apparatus 57, and is fed to the explosion turbine. Any surplus fuel passes through conduit 54 after opening of by-pass valve 45 and is returned to fuel container 51. The fuel pump and fuel injection device above-described are of any suitable construction, the forms illustrated being shown in H. Dubbel "Öl- und Gasmaschinen" published by Julius Springer, Berlin 1926, page 188, Fig. 197. Fuel pumps in association with gas turbines are shown in German Patent No. 522,102 and French Patent No. 661,579.

The quantity of air delivered by the compressor is not in all conditions of regulation in the same favorable proportion with reference to the introduced quantity of fuel for insuring the best combustion conditions and permitting the maintenance of the desired temperatures and flow velocities, and it is the function of the overflow valve 33 to allow the excess of air to flow past the explosion turbine directly from the compressor 7 through the conduit 32 and into the mixing device 34. For the sake of simplicity, the overflow valve 33 is shown by way of example as being capable of actuation by hand. In such case it is the duty of the engineer upon observation of the combustion, pressure and temperature conditions to adjust the valve 33 manually to a suitable degree.

I claim:

1. The method of regulating the available output of a power plant adapted to start under load with the development of the full torque, and comprising an explosion turbine including a plurality of constant volume explosion chambers adapted to be charged intermittently with fuel and compressed air for explosion therein, and an impulse rotor arranged to be impinged by the successive puffs of gases discharged by said chambers, a compressor driven by said impulse rotor to compress the air required for combustion, and expansion engines which generate the available output of the plant and are geared directly to the load but are mounted independently of the impulse rotor and compressor, said method comprising maintaining substantially constant the specific heat content of the charge fed to the chambers of the explosion turbine and also the number of explosion cycles per chamber per unit of time, and controlling the speed of revolution of the explosion turbine by varying the supply of fuel and the pressure of the compressed air charged into the explosion chambers thereof.

2. The method as set forth in claim 1, wherein the excess compressed air not required by the explosion turbine is discharged into the gases exhausting from such turbine to perform work in one of the expansion engines.

3. The method as set forth in claim 1, wherein, while the plant is idling, the gases exhausting from the explosion turbine are discharged into the atmosphere and compressed air is introduced into one of the expansion engines to cool the same.

4. The method as set forth in claim 1, wherein the plant includes a pump for circulating cooling oil about heated parts of the plant, said method including regulating the oil pump in dependence on the regulation of the explosion turbine.

5. The method as set forth in claim 1, wherein the plant includes a steam generating apparatus for generating steam with the waste heat of the plant, and a pump for delivering feed water to said apparatus, said method including regulating said pump in dependence on the regulation of the explosion turbine.

6. A portable power plant capable of starting under load and comprising an explosion turbine, including a plurality of constant volume explosion chambers adapted to be charged intermittently with fuel and compressed air for explosion therein, and an impulse rotor arranged to be impinged by the successive puffs of gases discharged by said chambers, a compressor driven by said turbine, one or more expansion engines operative to generate the available output of the plant, a conduit for conducting the gases exhausting from the explosion turbine to at least one of said engines, fuel feeding mechanism for delivering fuel into said chambers, means for regulating the quantity of air and fuel charged into said chambers to maintain substantially constant the specific heat content of the combustible charges, timing mechanism for said explosion chambers and operating to determine the cycle frequency of said chambers, and means for controlling the speed of the explosion turbine rotor while the specific heat content of the charges fed to the explosion turbine and also the number of cycles per unit of time are maintained constant.

7. A power plant as set forth in claim 6, including a connection between the compressor and said conduit, and control means in said conduit whereby the air not required by the explosion turbine when the latter is running below rated speed is discharged into one of the expansion engines.

8. A portable power plant capable of starting under load with the development of its full torque and comprising an explosion turbine including a plurality of constant volume explosion chambers adapted to be charged intermittently with fuel and compressed air for explosion therein, and an impulse rotor arranged to be impinged by the successive puffs of gases discharged by said chambers; a turbo-compressor connected to said impulse rotor to be driven thereby for producing the compressed air required for combustion; one or more expansion engines mounted independently of the explosion rotor and of the compressor and adapted to produce the available output of the plant; a conduit for conducting the exhaust gases of the explosion turbine to at least one of the expansion engines, there being no regulating means between the explosion turbine and such expansion engine; fuel feeding mechanism for supplying fuel to the explosion turbine; means for varying the supply of such fuel to said explosion turbine, whereby the speed of the latter is adjustable to correspond to the change in the power consumption of the compressor; means for simultaneously regulating the weight of air conducted to the explosion turbine by deflecting from the explosion turbine the excess of compressed air produced by the compressor; timing mechanism for controlling the operation of the explosion chambers; a device for operating said timing mechanism at substantially constant speed, whereby the cycle frequency per chamber is maintained substantially constant; and means for proportionally adjusting the fuel and air regulating means to maintain substantially constant the specific heat content of the charges introduced into the explosion chambers throughout the range of regulation of the turbine.

HANS HOLZWARTH.